United States Patent [19]

Toberg

[11] Patent Number: 5,183,088

[45] Date of Patent: Feb. 2, 1993

[54] STRIPPER FOR WOOD INCISOR

[76] Inventor: Lloyd H. Toberg, 4339 SE. 87th, Portland, Oreg. 97266

[21] Appl. No.: 877,771

[22] Filed: May 4, 1992

[51] Int. Cl.$^5$ .............................................. B27M 1/02
[52] U.S. Cl. ........................................ 144/2 J; 15/48; 144/2 R; 144/362
[58] Field of Search ............... 144/2 R, 2 J, 2 K, 362; 241/166, 167; 15/38, 39, 42, 48; 83/867

[56] References Cited

U.S. PATENT DOCUMENTS

| 433,538 | 8/1890 | Newlove | 15/48 |
|---|---|---|---|
| 3,931,935 | 1/1976 | Holman | 241/167 |
| 4,081,143 | 3/1978 | Johnson et al. | 241/167 |
| 4,858,660 | 8/1989 | Toberg | 144/362 |

Primary Examiner—W. Donald Bray
Attorney, Agent, or Firm—Chernoff, Vilhauer

[57] ABSTRACT

A stripping element includes an elongate hold-down bar that fits between adjacent incisor rings on a rotating drum wood incisor and prevents the teeth on the incisor rings from tearing chunks of wood from the piece of lumber as the teeth pull out after having made perforations. The hold-down bar has a planar lower surface which is parallel or slightly angled from the surface of the piece of lumber and is slightly separated from this surface. The apparatus includes a mounting structure that permits changing the distance between the lower surface of the hold-down bar and the surface of the piece of lumber. The stripping element also includes a cleaning pick which removes any wood chunks that become lodged between the incisor rings.

5 Claims, 3 Drawing Sheets

5,183,088

STRIPPER FOR WOOD INCISOR

BACKGROUND AND SUMMARY OF THE INVENTION

This invention relates to a stripper that permits the teeth of a wood incisor to be pulled out of a piece of lumber without tearing the wood.

The process of treating lumber with a preservative typically includes the preparatory step of placing perforations in the lumber's surfaces to increase the depth the preservative penetrates. This is accomplished by running the lumber past incising elements that comprise rotating drums having outwardly-projecting teeth. Such a device is shown in Toberg, U.S. Pat. No. 4,858,660. The teeth are located around the periphery of a plurality of annular incising rings which are separated from one another by annular spacer rings.

Because the effectiveness of the perforations formed by the incisor teeth is directly related to the density of the perforations, it is desirable to place the incisor rings as close together as possible. However, in practice the incisor teeth tend to follow grain lines as they enter the wood and thus often are deflected to one side or the other. If the incisor rings are too close together and two side-by-side teeth happen to bend towards one another, the teeth pinch the wood and when they are pulled back out they tear out a chunk of wood. In fact, several aligned pairs of teeth often combine and cause a segment of wood to be torn free which can result in a long strip of wood being separated from the remainder of the piece of lumber. In either case the lumber is blemished and its strength is diminished making it less valuable, and in the latter case it may be made useless. This problem is described in detail in a paper entitled *Effects of Incising on Preservative Treatment of Douglas Fir Lumber* by J. J. Morrell, S. M. Smith and J. E. Winandy.

The foregoing problem is overcome by the subject invention by placing a stripper element between each side-by-side pair of incisor rings. Each stripper element has a hold-down bar having an outer surface that is generally coplanar with the surface of the piece of lumber that is being incised, but is separated slightly from this surface. The hold-down bar is mounted such that it does not rotate with the incisor drum, and, in a preferred embodiment, the amount of separation between the outer surface of the hold-down bar and the surface of the piece of lumber is adjustable. As the teeth pull out of the piece of lumber, the hold-down bar prevents the upper layer of wood from pulling free from the piece of lumber and tearing does not occur. Thus, the incisor rings can be placed closer together than they otherwise could be and higher penetration densities are obtained.

Accordingly, it is a principal object of the subject invention to prevent the teeth of wood incisors from causing tearing chunks of wood from the piece of lumber being incised even when the teeth are placed close to one another.

It is a still further object of the subject invention to provide a hold-down bar between wood incisor incisor rings which strips the teeth from the piece of lumber without the occurrence of tearing.

It is a yet further object of the subject invention to provide such a hold-down bar in which the distance between the hold-down bar and the surface of the piece of lumber being incised is adjustable.

DETAILED DESCRIPTION OF A PREFERRED EMBODIMENT

Figure 1:
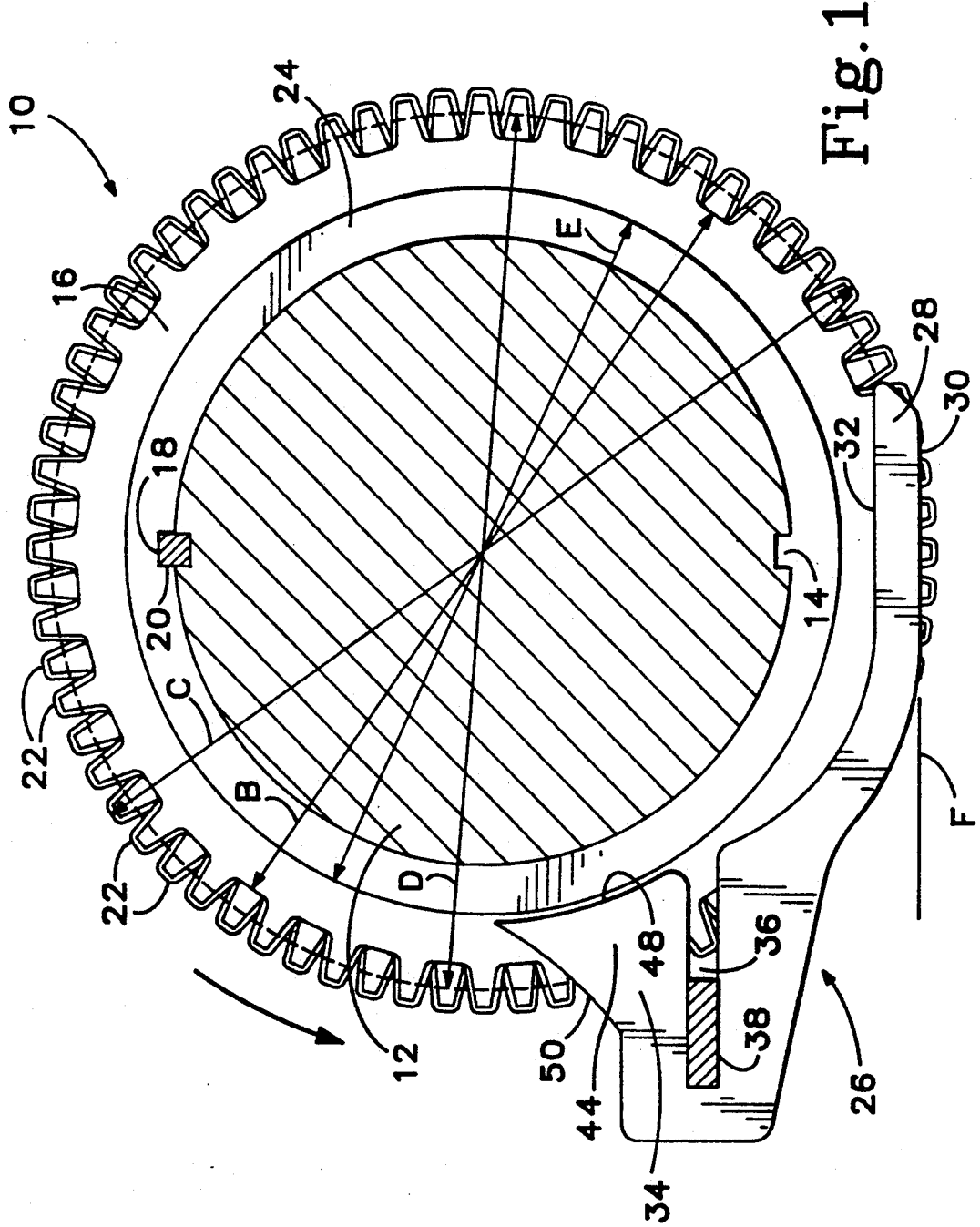
FIG. 1 is a side elevation view, in cross section, of a wood incisor embodying the stripper element of the subject invention.
Figure 2:
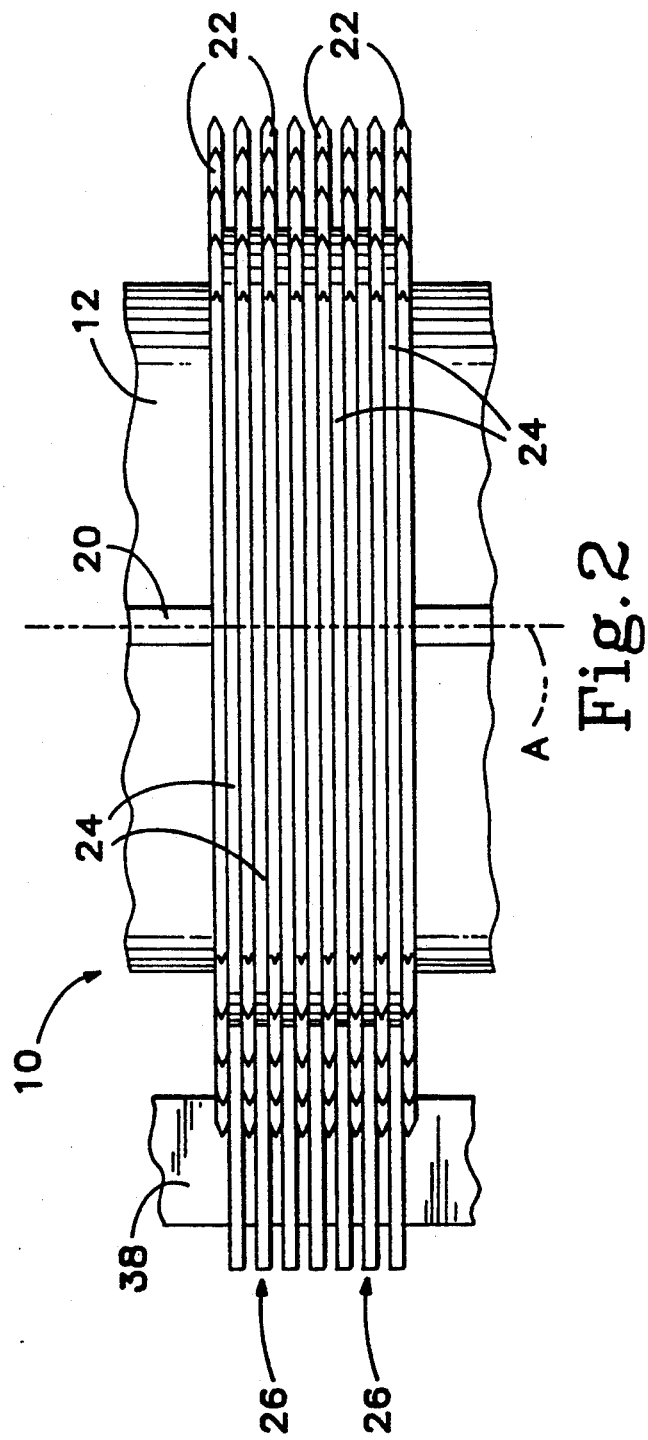
FIG. 2 is a fragmentary plan view of the wood incisor of FIG. 2.

Referring to FIGS. 1 and 2 of the drawings, a wood incisor incising element 10 includes a drum 12 that is rotatable about a central axis A. In the embodiment illustrated, the drum is a circular cross-sectioned cylinder and has a pair of keyways 14 located in its outer surface. A plurality of annular incisor rings 16 are sized to fit snugly over the drum. The incisor rings include keyways 18, and a key 20 fits into the keyways 14 and 18 to cause the incisor rings to rotate with the drum. Located around the periphery of each incisor ring 16 are a plurality of spaced-apart outwardly-projecting teeth 22. The base of the teeth are located at a base diameter B and their tips are located at a tip diameter C. In operation the teeth only penetrate up to a penetration depth, defined by a penetration diameter D, that is intermediate the tip and base diameters.

Interposed between the incisor rings 16 are one or more spacer rings 22 that also fit snugly over the drum and are coupled to it by the key 20. The spacer rings have an outer diameter E which is less than the base diameter B.

Located outwardly adjacent to each spacer ring is a stripper element 26 that does not rotate with the drum. Each stripper element includes an elongate hold-down bar 28 having a planar outer surface 30 that is generally coplanar with the tangent F of a circular cylinder that is centered on axis A and has a diameter that is equal to, or slightly less than, the penetration diameter D. The spacer bar is positioned circumferentially on the side of the drum that faces the piece of lumber 31 being incised (FIG. 4) so that the tangent F is parallel with the top surface of the piece of lumber. The bar has a width which is slightly less than the width of the spacer rings and its height is such that its inner surface 32 is separated from the associated spacer ring by approximately 1/16 of an inch. The bar is long enough so that is extends across all of the teeth that extend outwardly beyond its outer surface at any time.

Figure 3:
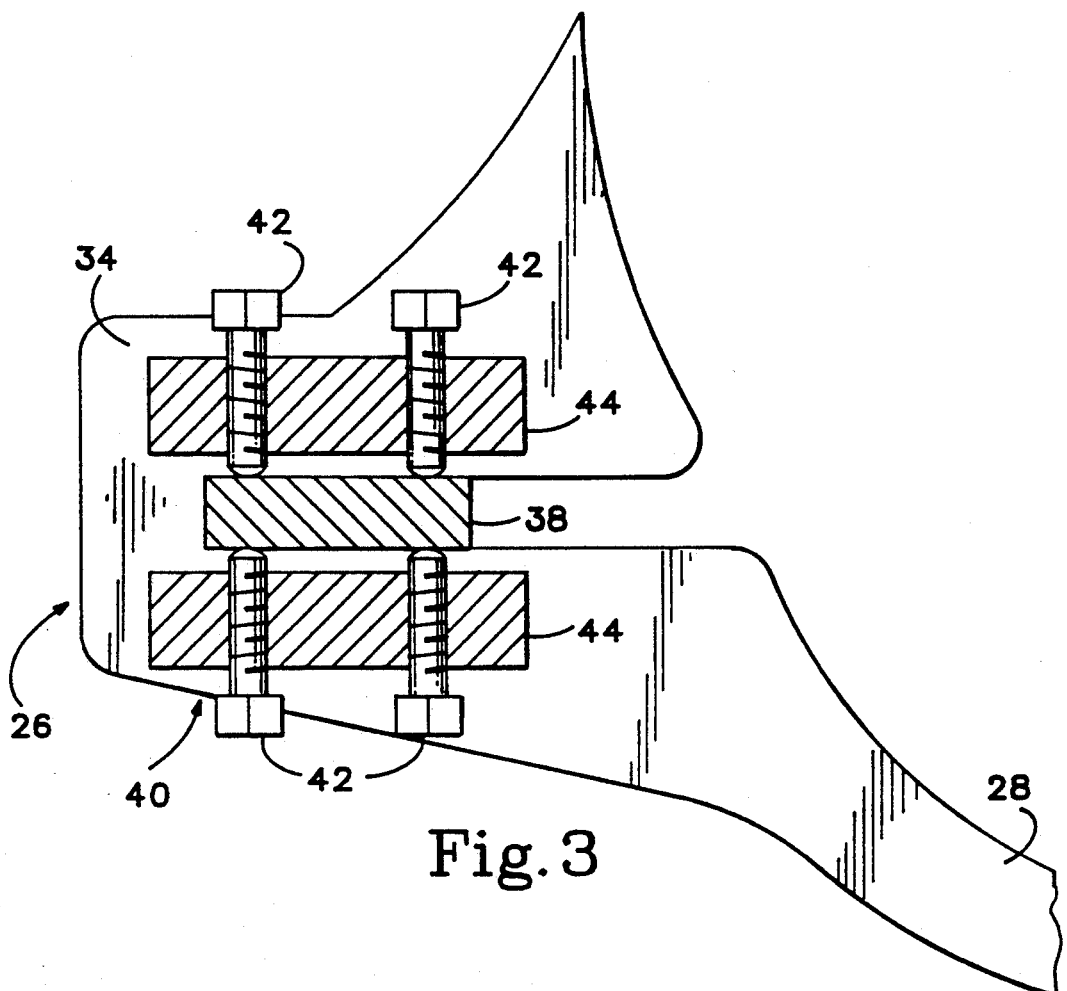
FIG. 3 is a detail view, at an enlarged scale, showing how the stripper element is attached to the wood incisor.

The body 34 of each stripper element 26 includes a rectangular slot 36 that fits tightly over a rectangular plate 38 that extends along the entire extent of the drum. The plate 38 supports the stripper elements in the proper orientation relative to the incisor rings. Referring now also to FIG. 3, the plate 38 is held at both of its extremities by an adjustment mechanism 40 which permits the plate moved toward or away from the piece of lumber. Each adjustment mechanism 40 includes four set screws 42, two on each side of the plate, that extend through threaded engagement with frame elements 44 into contact with the sides of the plate 38. Thus, the distance between the outer surface 30 of the bar 28 and the penetration diameter D can be varied. If the outer surface is too close to the tangent, the bar will hit high spots in the surface of the wood being processed. If they are too far apart, the apparatus will not serve its intended purpose. However, the distance between the bar and the wood should be as small as possible. While the bar is sized to provide such a gap for a particular incisor ring, in practice the teeth in the incisor rings do not always penetrate exactly to the penetration depth and some adjustment is necessary.

The upper portion of each stripper element body may provide a cleaning element 46 that removes any wood particles that may have become lodged between incisor rings. The cleaning element has an arcuate inner face 48 that corresponds to and is closely spaced from the outside of the associated spacer ring 24. The upper face 50 of the stripping element is concave so as to provide a point where it intersects with the inner face. Since the drum rotates toward this point (counterclockwise as shown in FIG. 1), pieces of wood trapped between incisor rings strike the upper face 50 and are forced outwardly as the drum is rotated.

Figure 4:
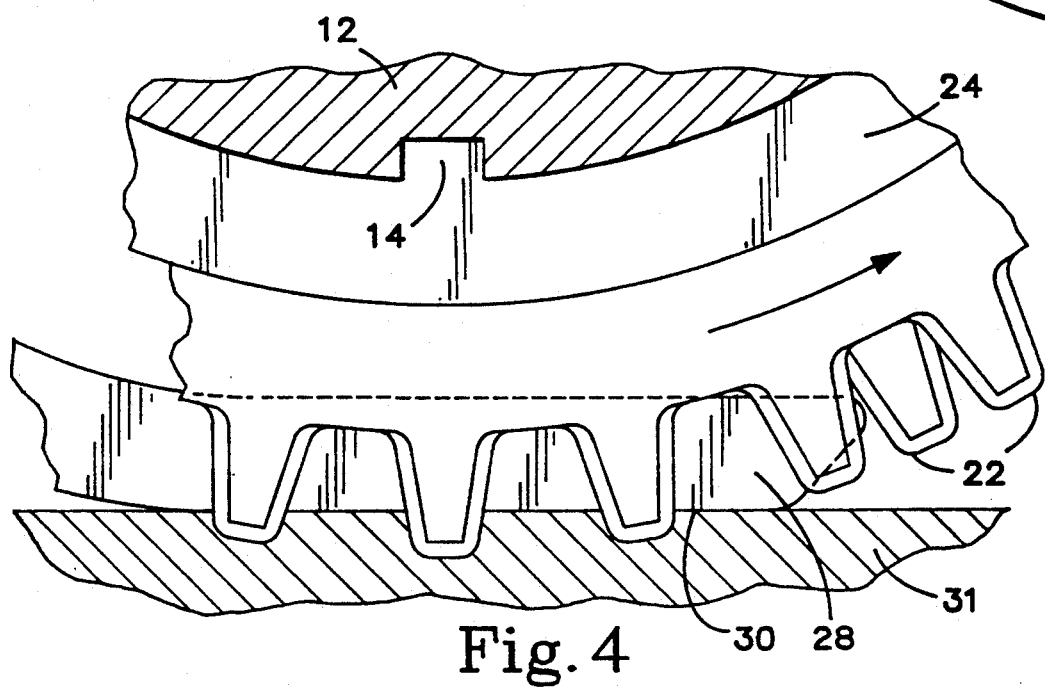
FIG. 4 is a fragmentary detail view, at an enlarged scale, showing the incisor teeth as they are pulled out of a piece of lumber being incised.

Referring now to FIG. 4, as the teeth 22 pull out of the piece of lumber, the bar contacts the top surface of the piece of lumber and strips it off the teeth before chunks of lumber can be pulled loose. Thus, the teeth are pulled free without causing damage to the piece of lumber. As a result, the incisor rings can be placed much closer together and higher perforations densities can be attained.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A wood incisor for forming a plurality of spaced-apart perforations in the surface of a piece of lumber preparatory to treatment of the lumber with a preservative, comprising:
    (a) a drum that is rotatable about a central longitudinal axis;
    (b) a plurality of annular incisor rings mounted on said drum for rotation therewith;
    (c) a plurality of annual spacer rings, having an outside diameter, mounted on said drum for rotation therewith, said incisor rings being interposed between said incisor rings;
    (d) said incisor rings including a series of spaced-apart teeth that project radially outward from the periphery thereof, said teeth having a predetermined depth extending between a base diameter, which is larger than the outside diameter of said spacer ring, and a tip diameter; and
    (e) a plurality of hold-down bars, that do not rotate with said drum, one of said hold-down bars being located radially outward from each of said spacer rings, each hold-down bar having a planar outer surface that is substantially parallel with the tangent of a circular cylinder that is coaxial with said central longitudinal axis and has a diameter that is intermediate said base diameter and said tip diameter.

2. The wood incisor of claim 1 wherein said hold-down bar has an inner surface that is adjacent to said spacer ring.

3. The wood incisor of claim 1 wherein said hold-down bar has a length that is sufficient to extend across all of said teeth that extend radially outwardly beyond said outer surface at one time.

4. The wood incisor of claim 1 wherein said teeth have a penetration depth that extends between said tip diameter and a penetration diameter that is located intermediate said tip diameter and said base diameter, and said planar outer surface is positioned radially inwardly adjacent to said penetration diameter.

5. The wood incisor of claim 4 wherein said planar outer surface is offset from said penetration diameter by less than 0.150 inches.

* * * * *